(12) United States Patent  
Miyawaki et al.

(10) Patent No.: US 7,401,739 B2  
(45) Date of Patent: Jul. 22, 2008

(54) CASE FOR CARD-TYPE PORTABLE INFORMATION PROCESSING DEVICE

(75) Inventors: Chikanori Miyawaki, Neyagawa (JP); Mikiya Ueda, Kobe (JP); Yoshiaki Akutagawa, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 272 days.

(21) Appl. No.: 10/559,103

(22) PCT Filed: Apr. 6, 2005

(86) PCT No.: PCT/JP2005/006786

§ 371 (c)(1),  
(2), (4) Date: Dec. 2, 2005

(87) PCT Pub. No.: WO2005/098575

PCT Pub. Date: Oct. 20, 2005

(65) Prior Publication Data

US 2007/0090194 A1    Apr. 26, 2007

(30) Foreign Application Priority Data

Apr. 9, 2004    (JP) ............................. 2004-114836

(51) Int. Cl.  
*G06K 7/00*    (2006.01)
(52) U.S. Cl. ..................... 235/486; 235/492; 206/472; 206/473; 206/308.3
(58) Field of Classification Search ................. 235/486, 235/492; 361/737; 206/472, 473, 308.3  
See application file for complete search history.

(56) References Cited

U.S. PATENT DOCUMENTS 6,364,674 B1 *    4/2002    Kajiura ...................... 439/159

FOREIGN PATENT DOCUMENTS

| JP | 7-40573 | 7/1995 |
|---|---|---|
| JP | 2000-99668 | 4/2000 |
| JP | 2001-109856 | 4/2001 |
| JP | 2002-157557 | 5/2002 |
| JP | 2003-180432 | 7/2003 |

* cited by examiner

*Primary Examiner*—Michael G. Lee  
*Assistant Examiner*—Kristy A Haupt  
(74) *Attorney, Agent, or Firm*—Steptoe & Johnson LLP

(57) ABSTRACT

An inventive card-type portable information processing device case permits a user to select a mode in which a card-type portable information processing device is taken out of the case with a cap attached thereto or a mode in which the card-type portable information processing device is taken out of the case with the cap detached therefrom and engaged with the first cover. The inventive case includes a cap engagement portion (15) provided in a first cover (1). By moving the card-type portable information processing device (30) in a direction A, the card-type portable information processing device (30) is taken out of the case with the cap (40) attached thereto. By moving the card-type portable information processing device (30) in a direction C, only the card-type portable information processing device (30) is taken out of the case with the cap (40) engaged in the cap engagement portion (15) of the first cover (1).

12 Claims, 17 Drawing Sheets

CASE FOR CARD-TYPE PORTABLE INFORMATION PROCESSING DEVICE

The present application is based on International Application PCT/JP2005/006786, filed Apr. 6, 2005, which application is incorporated herein by reference in its entirety.

TECHNICAL FIELD

The present invention relates to a case to be used for protection of a card-type portable information processing device such as a PC card.

BACKGROUND ART

Various kinds of card-type portable information processing devices typified by PC cards such as memory cards, LAN cards and hard disks have recently been commercialized. These card-type portable information processing devices are ubiquitous, and each have a reduced size and a reduced thickness. Protection cases and terminal protection caps are used for preventing dust and moisture from intruding into the card-type portable information processing devices, for reducing the influence of static electricity and for reducing drop impact.

PC card protection cases are conventionally known, which protect the card-type portable information processing devices from static electricity, dust, moisture and impact when the card-type portable information processing devices are carried in the protection cases. The cases are mostly composed of a transparent resin or the like for easy check of the inside thereof. Further, caps are also known, which cover terminal portions for protecting only the terminal portions from static electricity, dust, moisture and impact.

JP7-40573U discloses a flat IC memory card case for storing an IC memory card between two covers. The IC memory card case includes a protection rib for holding the IC memory card in the covers, a hinge connecting the two covers, and an engagement member provided on edges of the covers for preventing the covers from being opened when the covers are closed.

JP2000-99668A discloses a PC card cap to be used for protecting terminal portions of a PC card. The PC card cap is such that two rectangular cap portions engageable with the terminal portions of the PC card are pivotally connected to opposite edges of a rectangular cap body having substantially the same length as the PC card by pins. For use, the cap portions are pivoted with the cap body fitted along the PC card so as to be engaged with the terminal portions of the PC card. Thus, the PC card cap is attached to the terminal portions. With the PC card cap attached to the terminal portions of the PC card, a portion of the PC card other than the terminal portions is exposed.

DISCLOSURE OF THE INVENTION

Problems to be Solved by the Invention

The IC memory card case disclosed in JP7-40573U can cover and protect the entire card-type portable information processing device, but has a correspondingly greater outer shape. The size of the IC memory card case puts limitations when the IC memory card case is carried or stored in a pocket or the like. On the other hand, the IC card cap disclosed in JP2000-99668A can more tightly cover only the terminal portions and, hence, is more reliable and compact than the case. Therefore, the IC card cap is more convenient to carry. However, the portion of the PC card other than the terminal portions covered with the cap cannot be protected. Thus, the conventional case and cap each have both an advantage and a disadvantage. Further, it is cumbersome to use either the case or the cap depending on circumstances. This results in poor usability.

In consideration of the convenience for a user, a case for storing a card-type portable information processing device fitted with a cap has been contemplated. For example, when the card-type portable information processing device is used, the information processing device is taken out of the case with the cap detached therefrom. When the card-type portable information processing device is carried in a room or left on a desk for a short period of time, the information processing device is taken out of the case with the cap attached thereto. Further, when the card-type portable information processing device is stored for a long period of time or carried outside the room, the information processing device is stored in the case with the cap attached thereto. Thus, the user can select how to use the case and the cap. With this arrangement, the case and the cap are convenient to use. However, when the user wants to immediately use the card-type portable information processing device stored in the case, the user needs to take out the card-type portable information processing device from the case and then remove the cap. This is cumbersome for the user.

With the aforesaid arrangement, there is a possibility that the removed cap is lost. Where the card-type portable information processing device is stored in the case without the cap when the cap is missing, a gap corresponding to the thickness of the cap is formed between the card-type portable information processing device and the case, resulting in rattle of the card-type portable information processing device in the case. When the card-type portable information processing device is transported by a car or the like, for example, the information processing device may be vibrated in the case. Further, when the case is dropped, the card-type portable information processing device in the case may collide against a wall of the case, so that a shock may be applied to electrical components incorporated in the information processing device. Even if the electrical components are not damaged by the shock, the card-type portable information processing device rattles in the case during the carrying thereof. This causes an uncomfortable rattling sound to degrade the quality of the case. Hence, there is a limitation that the cap should be attached to the information processing device to maintain the reliability of the information processing device and the quality of the case whenever the information processing device is stored in the case.

In view of the foregoing, it is an object of the present invention to provide a convenient case with a cap for storing a card-type portable information processing device with the cap attached to the information processing device, the case permitting a user to select a mode in which the card-type portable information processing device is taken out of the case with the cap attached thereto or a mode in which the card-type portable information processing device is taken out of the case with the cap detached therefrom.

It is another object of the present invention to provide a case with a cap, which stores a card-type portable information processing device with or without the cap attached to the information processing device, and is highly resistant to vibration and shock, wherein a difference in a gap formed between the card-type portable information processing device and the case is reduced so that the information processing device is prevented from rattling in the case even if the information processing device is stored in the case with the cap detached therefrom.

Means for solving the problems

According to the present invention, a card-type portable information processing device case for storing a card-type portable information processing device having a terminal portion provided at a front edge thereof with or without a cap attached to the portable information processing device for covering the terminal portion comprises first and second covers, and a cap engagement portion provided in at least one of the first and second covers for engagement with the cap covering the terminal portion, wherein a first mode in which the cap is attached to the card-type portable information processing device or a second mode in which the cap is engaged with the cap engagement portion and detached from the card-type portable information processing device is selected to take out the card-type portable information processing device from the case by changing a direction or an angle in/at which the card-type portable information processing device is detached from the cap engagement portion.

In the inventive card-type portable information processing device case, the cap has a thin wall portion provided in a part of a front edge thereof, and the one cover has an engagement projection which is brought into abutment against the thin wall portion of the cap.

In the card-type portable information processing device case, the cap has a hole formed in a part of a front face thereof not opposed to the terminal portion of the card-type portable information processing device, wherein a distal end of the engagement projection of the one cover is inserted through the hole into abutment against the front edge of the card-type portable information processing device.

Effects of the invention

When the card-type portable information processing device is taken out of the case, the first mode in which the cap is attached to the card-type portable information processing device or the second mode in which the cap is engaged with the first cover and detached from the card-type portable information processing device is selected by changing the direction or the angle in/at which the card-type portable information processing device is taken out of the case. Thus, a user can take out the card-type portable information processing device from the case with or without the cap attached to the information processing device depending on the need. Where the cap is needed when the information processing device is carried, the information processing device is taken out of the case with the cap attached thereto. When the information processing device is immediately used in a host side device, the information processing device is taken out of the case with the cap detached therefrom. Thus, the case with the cap is convenient to use.

Further, the cap has the thin wall portion provided in the front face thereof, and the first cover has the engagement projection to be brought into abutment against the thin wall portion. Thus, a gap formed between the case and the card-type portable information processing device fitted with the cap differs from a gap formed between the case and the card-type portable information processing device not fitted with the cap only by a difference corresponding to the thickness of the thin wall portion. Where a spike-like projection is inserted through the hole of the front face of the cap into abutment against a frame edge of the card-type portable information processing device, the gap between the case and the card-type portable information processing device can be kept constant irrespective of the presence or absence of the cap. As a result, the gap between the case and the portable information processing device with or without the cap can be minimized, so that the reliability of the case against the vibration and the shock can be maintained. Further, the rattling sound can be minimized which may otherwise occur due to a greater gap between the case and the card-type portable information processing device during the carrying of the information processing device. Thus, the quality of the case can be maintained.

BEST MODE FOR IMPLEMENTING THE INVENTION

The present invention will hereinafter be described with reference to FIGS. 1 to 17. In the following embodiments, a PC card is shown as an example of the card-type portable information processing device, but the card-type portable information processing device is not limited to the PC card as long as it has a terminal portion provided at a front edge portion.

First Embodiment

Figure 1:
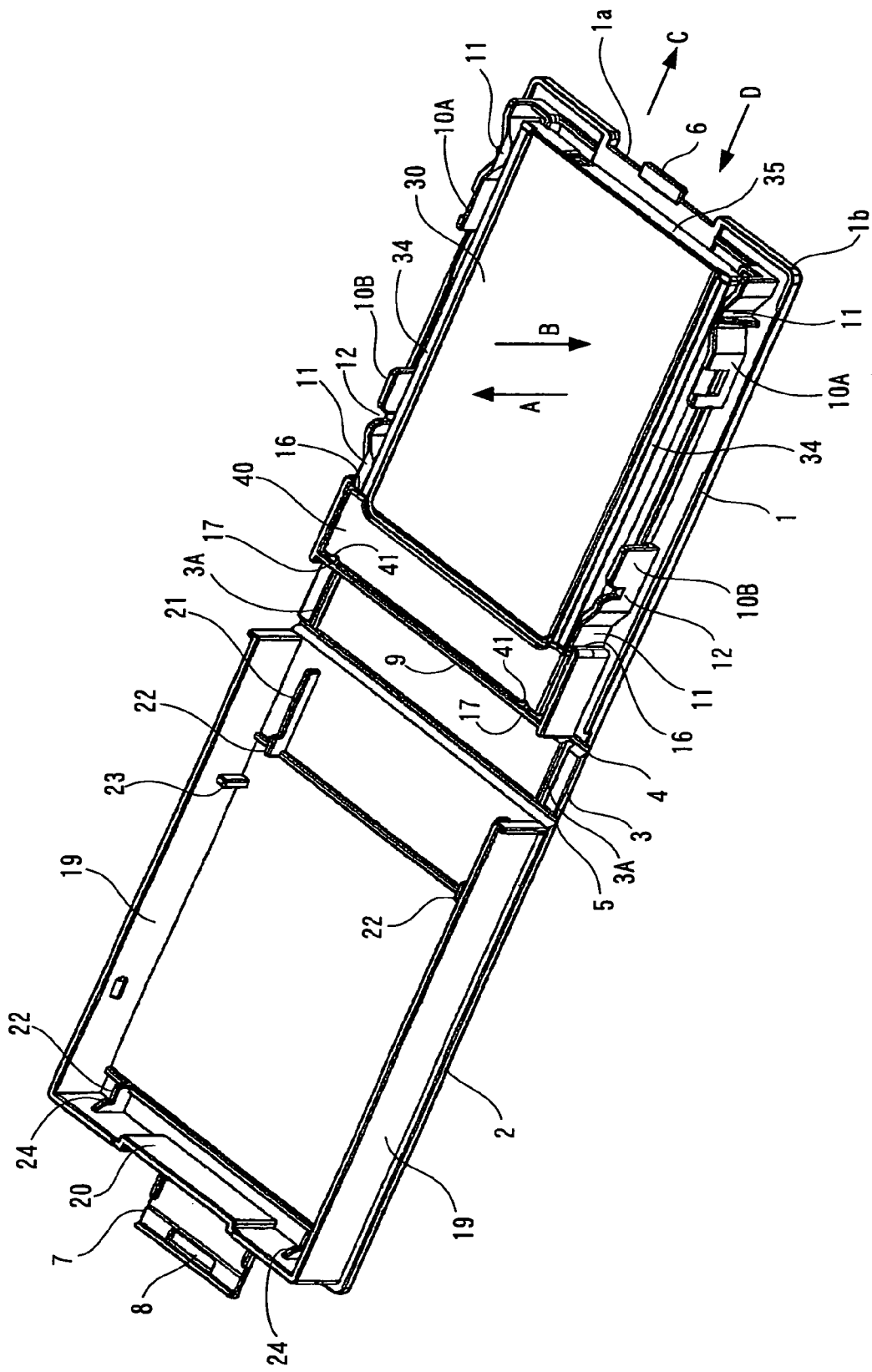
FIG. 1 is a perspective view of a case according to a first embodiment of the present invention in which a PC card is accommodated with a cap attached thereto.
Figure 2:
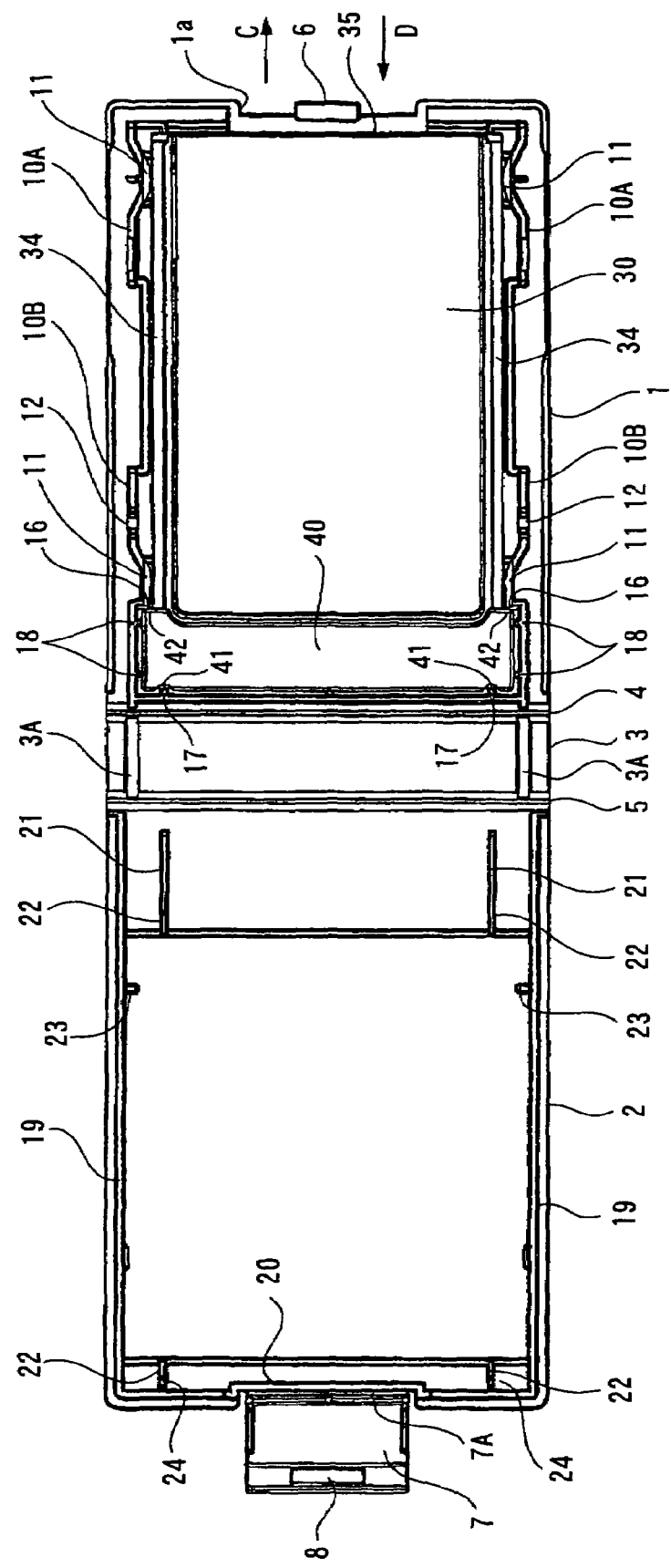
FIG. 2 is a plan view of the case according to the first embodiment of the invention in which the PC card is accommodated with the cap attached thereto.
Figure 3:
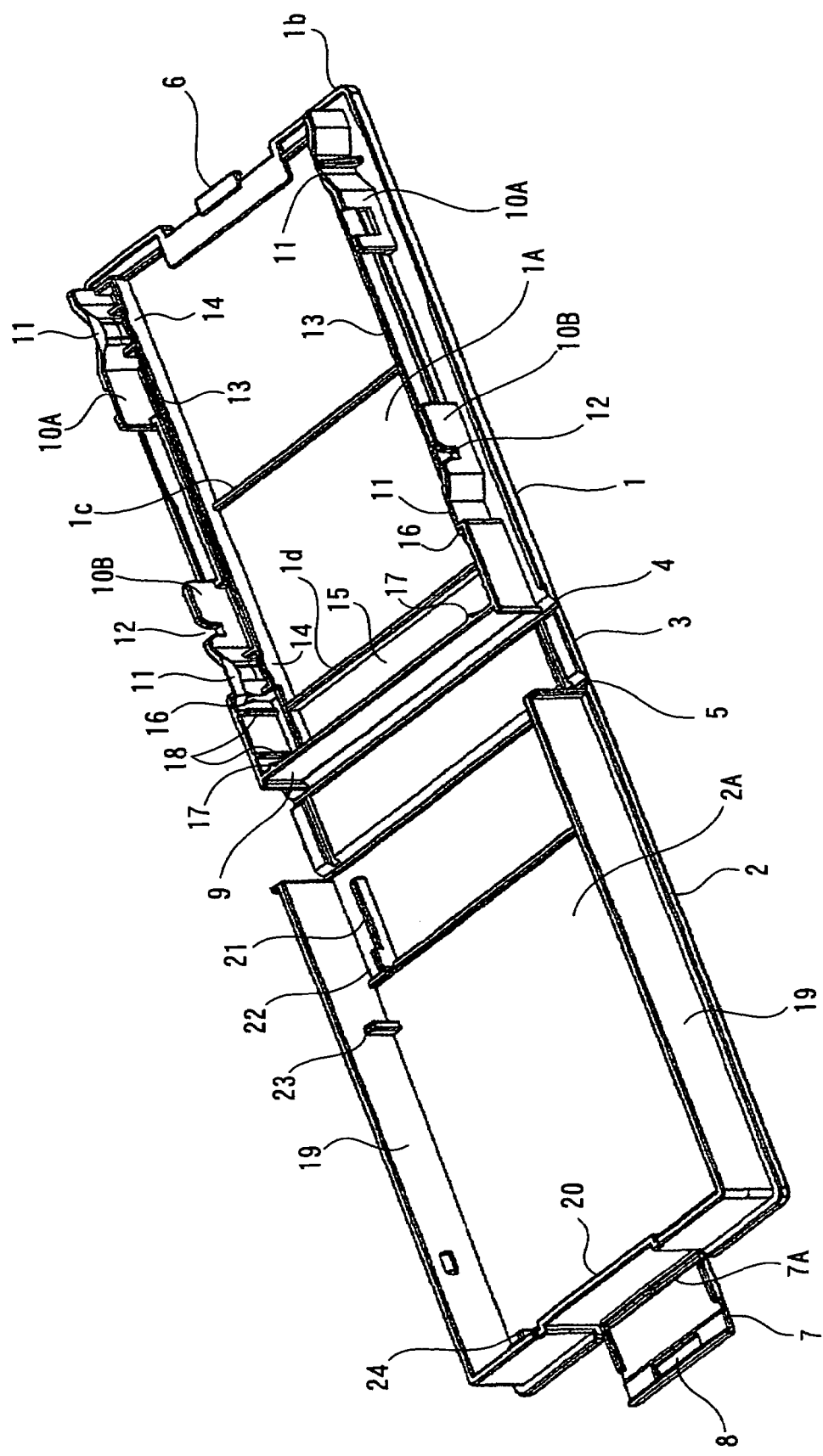
FIG. 3 is a perspective view of the case according to the first embodiment of the invention.

FIG. 1 is a perspective view of a case with a cap (hereinafter referred to simply as "case") according to a first embodiment of the present invention in which a PC card is accommodated with the cap attached thereto, and FIG. 2 is a plan view of the case according to the first embodiment of the invention in which the PC card is accommodated with the cap attached thereto. FIG. 3 is a perspective view of the case according to the first embodiment of the invention. In FIGS. 1 to 3, reference numerals 1 and 2 denote first and second covers, respectively, and a reference numeral 3 denotes a connection portion which connects the first cover and the second cover. The first and second covers are integrally connected to the connection portion 3 by hinge portions 4, 5 each having a smaller thickness. The first cover 1 is pivotal about the hinge portion 4 with respect to the connection portion 3, and the second cover 2 is pivotal about the hinge portion 5 with respect to the connection portion 3. The first cover, the second cover and the connection portion 3 constitute a case to be opened and closed. The case may be injection-molded from a resin or a like material. Where the case is composed of an antistatic resin, an influence of static electricity is suppressed.

In this embodiment, the first cover 1 and the second cover 2 of the case are connected via the connection portion 3 by way of example. The second cover 2 may be separated from the first cover 1 without the provision of the connection portion 3, and fitted in the first cover. In this case, the second cover 2 additionally includes a wall provided along an open side thereof and, when the second cover 1 is fitted in the first cover, the second cover completely covers one side of the first cover 1.

The first cover 1 includes a rectangular top plate 1A as a major portion thereof. The first cover 1 further includes a wall 9 provided upright along an inner edge of the top plate 1A (edges of the top plates 1A, 2A adjacent to the connection portion 3 are hereinafter defined as inner edges, and edges of the top plates 1A, 2A apart from the connection portion 3 are hereinafter defined as outer edges). Side wall portions 10A, 10A, 10B, 10B are provided in opposed relation on opposite end portions of opposite side edges of the top plate 1A. The side wall portions 10A, 10A, 10B, 10B respectively include positioning projections 11 each projecting inward, and the four positioning projections 11 restrict widthwise movement of the PC card 30.

The side wall portions 10B, 10B provided on the inner edge side each have a slit 12 formed therein outward of the projection 11. Engagement pieces 23 of the cover 2 to be described later are brought into engagement with the slits 12. Inner edges of the side wall portions 10B, 10B are connected to opposite ends of the wall 9 to define a cap engagement portion 15 in which a cap 40 is fitted as will be described later. The inner edges of the side wall portions 10B, 10B slightly project from the wall 9 so as to be respectively fitted in grooves 3A, 3A formed in the connection portion 3 when the case is closed.

In FIG. 3, a pair of rails 13 each having a small width are provided on the top plate 1A inwardly of the side wall portions 10A, 10B of the first cover 1 along the side walls 10A, 10A, 10B, 10B. Four support portions 14 having the same height are provided on upper surfaces of the rails 13 at opposite ends of the rails 13 as projecting slightly from the upper surfaces of the rails 13. The rails 13 are smoothly continued to the support portions 14.

Figure 4:
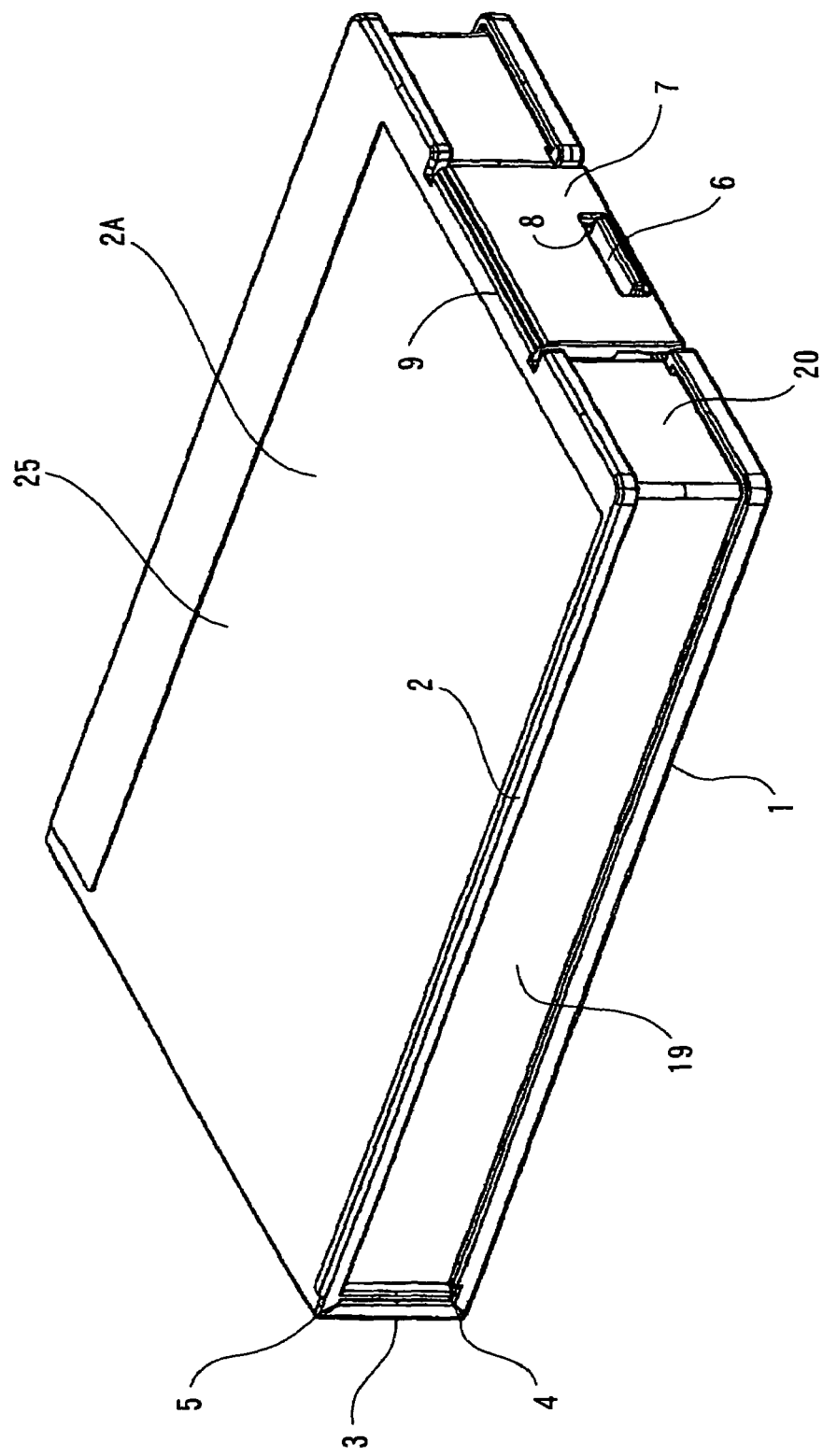
FIG. 4 is a perspective view of the case in a closed state according to the first embodiment of the invention.

The top plate 1A has a shallow cutaway portion 1a provided in an outer edge portion thereof as having substantially the same thickness as an engagement member 7 to be described later and an integral engagement portion 6 provided on a middle portion of the outer edge portion thereof. With the case being closed, the engagement portion 6 is engageable with an engagement hole 8 of the engagement member 7 to be described later, and the engagement member 7 is fitted in the cutaway portion 1a as shown in FIG. 4.

Ribs 1c, 1d are provided on a back surface of the top plate 1A between the opposite rails 13. The top plate 1A has a rib 1b extending along an outer periphery thereof except the inner edge, so that side walls 19, 19 and a wall 20 are fitted inward of the rib 1b when the case is closed.

Figure 5:
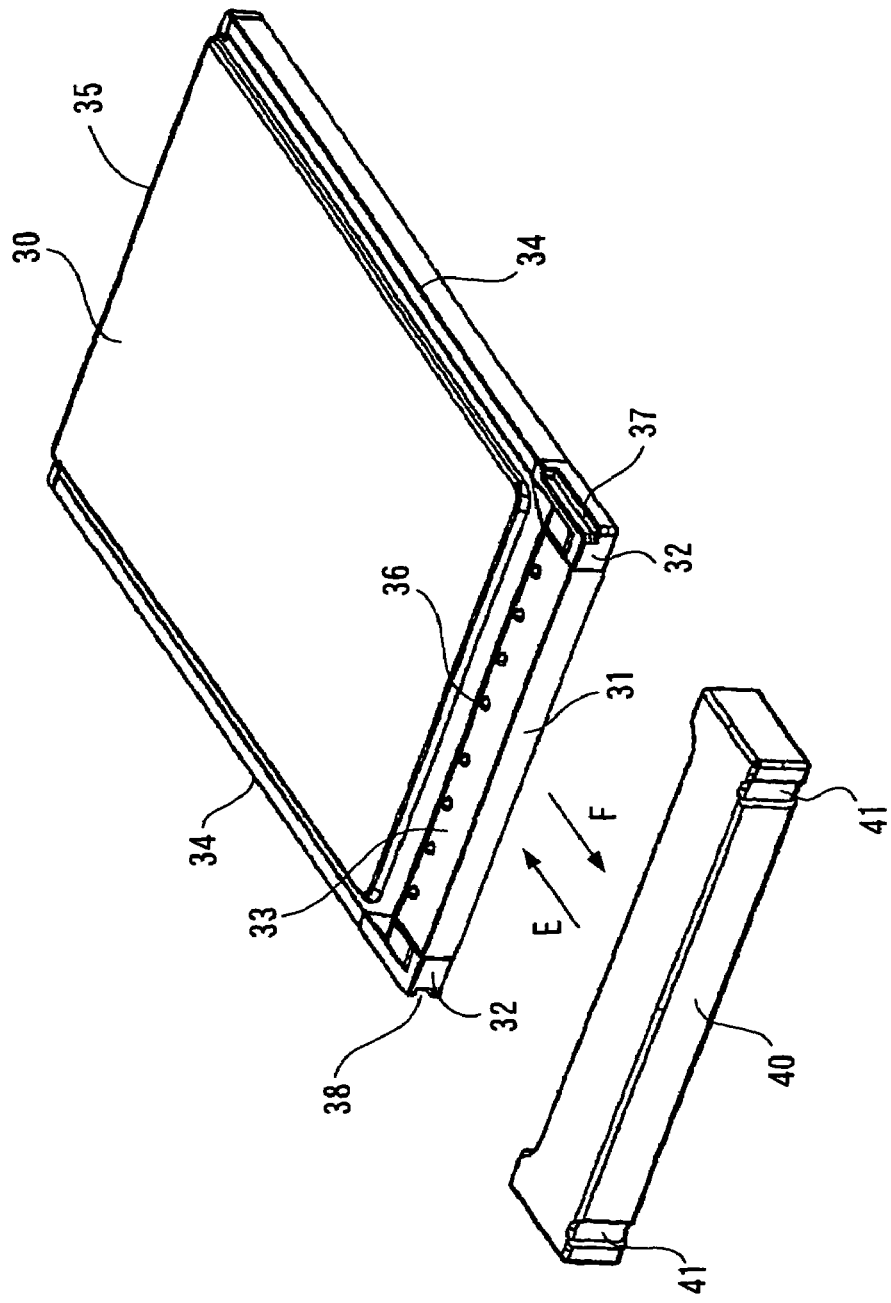
FIG. 5 is a perspective view of the PC card and the cap according to the first embodiment of the invention.
Figure 6:
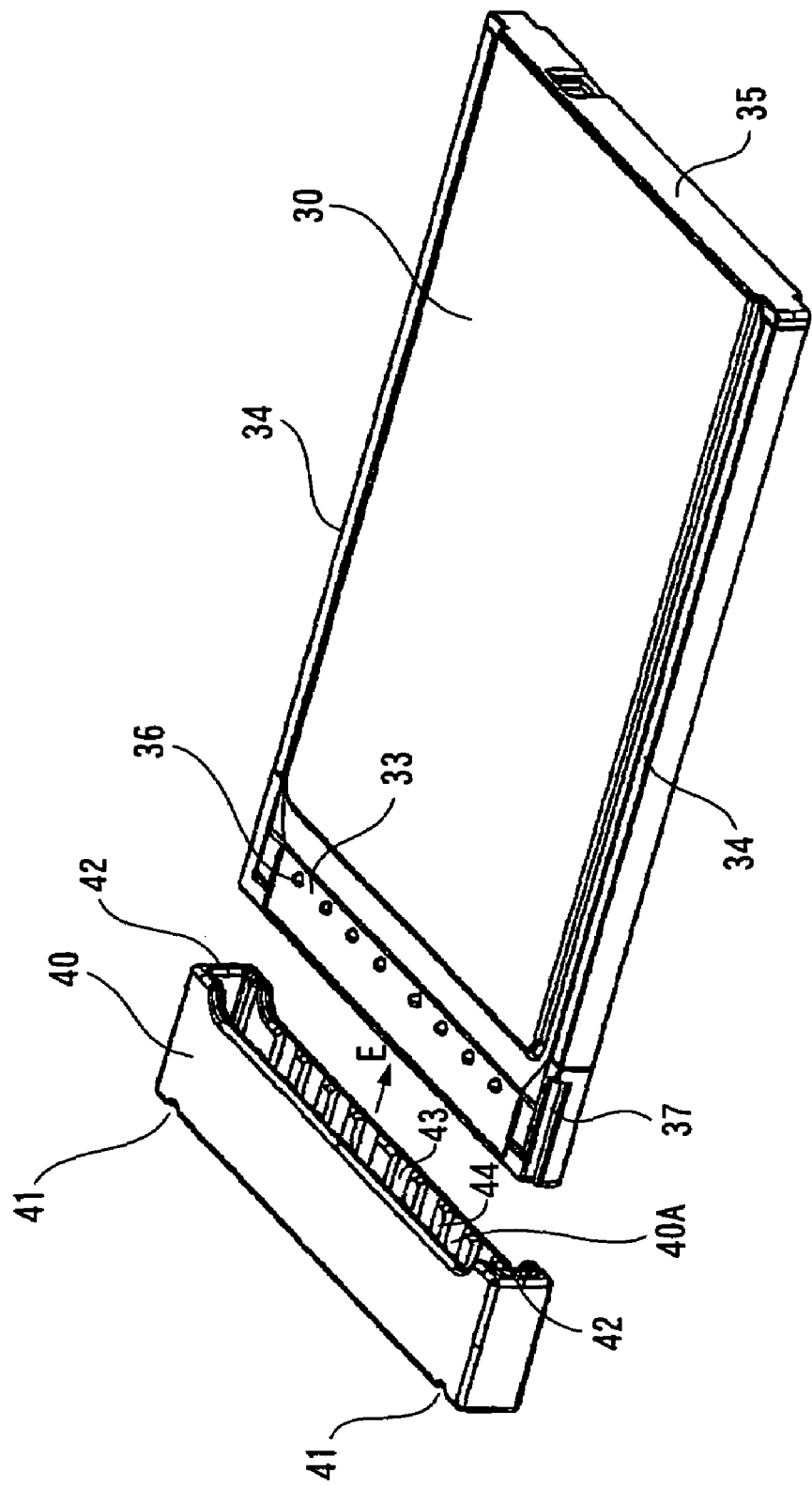
FIG. 6 is a perspective view of the PC card and the cap according to the first embodiment of the invention.
Figure 7:
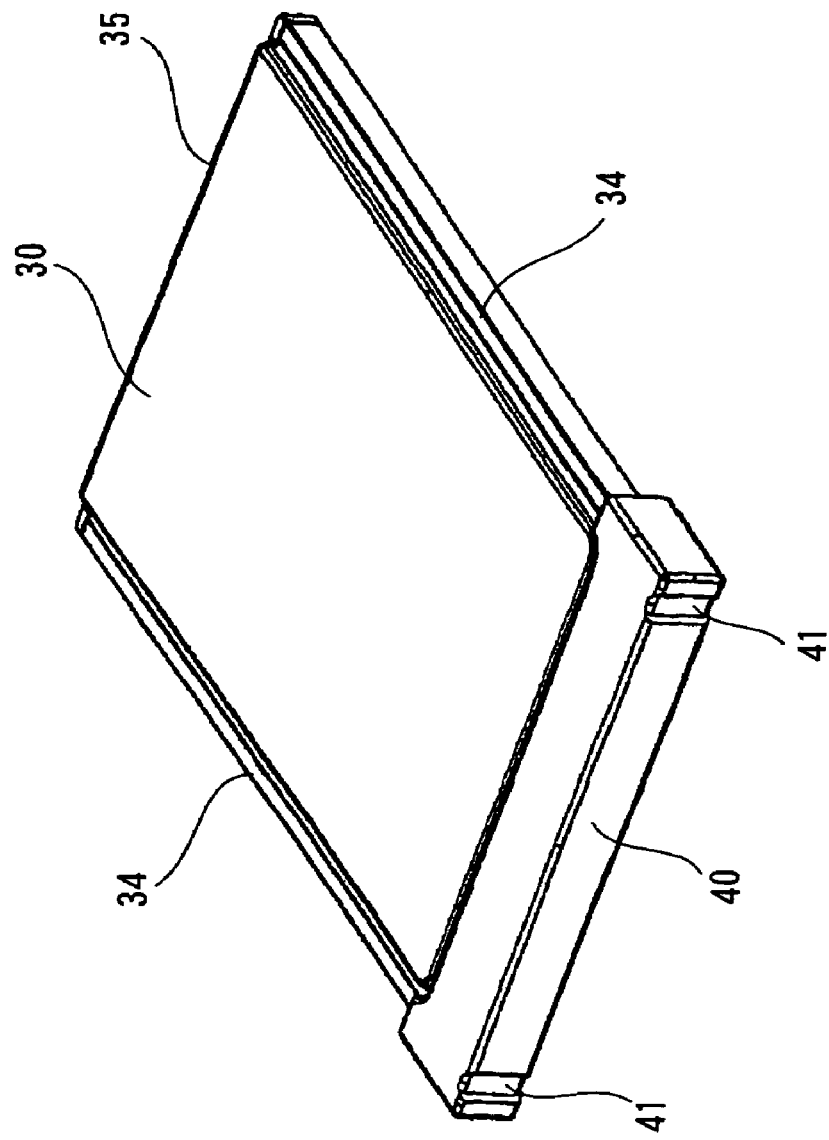
FIG. 7 is a perspective view of the PC card with the cap attached to the PC card according to the first embodiment of the invention.

In FIGS. 1 and 2, reference numerals 30 and 40 denote the PC card and the cap, respectively. FIGS. 5 to 7 are perspective views of the cap and the PC card according to the first embodiment of the invention. The PC card 30 and the cap 40 will be described with reference to FIGS. 5 to 7.

The shape and size of the PC card are specified by the PC card specifications. There are three sizes, i.e., Type I, Type II and Type III, which have different thicknesses at center portions of the cards.

A PC card having a data bus width of 16 bits and a higher speed CardBus having a data bus width of 32 bits have been standardized. These cards are herein called "PC cards" if there is no need to distinguish these cards from each other. The PC card having a data bus width of 16 bits and the CardBus having a data bus width of 32 bits are herein called "16-bit PC card" and "CardBus PC card", respectively, if there is a need to distinguish these cards from each other.

Where the PC card 30 is of Type II, the center portion of the PC card 30 has a thickness of 5 mm at the maximum, and a substrate mounted with electrical components is typically incorporated in the center portion of the PC card 30. A reference numeral 31 denotes a terminal portion, which is connectable to a connector provided in a slot of a host side device not shown. In the PC card, the terminal portion has a female connector having 68 terminal holes. A reference numeral 32 denotes frame end portions disposed at opposite sides of the terminal portion. A reference numeral 33 denotes a ground plate whose shape and size are specified by the CardBus specification but not specified for the 16-bit PC card. Dimples 36 to be brought into contact with ground terminals provided in the slot not shown are provided on an upper surface of the ground plate 33. The 16-bit PC card has substantially the same configuration and dimensions as the CardBus PC card except that the dimples 36 are not provided.

The frame end portions 32 respectively have a step 37 and a groove 38, which prevent the PC card 30 from being inserted into the slot upside down or in a laterally reversed orientation. Further, the step of the frame end portion 32 serves as a voltage key for distinction between source voltages of 3.3V and 5V, and the thickness of the step is varied depending on the voltage specification.

The widthwise opposite edges of the PC card which are slidably guided by rail grooves provided in the slot when the PC card is inserted into the slot not shown each have a thickness of 3.3 mm (which is common for Type I, Type II and Type III). For Type II, the thickness of the widthwise opposite edges of the PC card is smaller than the thickness (5 mm) of the center portion. The thinner opposite edge portions (each having a thickness of 3.3 mm) are herein defined as rail sliding portions 34. A reference numeral 35 denotes a rear face of the PC card opposite from the terminal portion 31.

The cap 40 is composed of a resin or a synthetic rubber. For suppression of an electrostatic influence, a material containing an antistatic material may be selected. Alternatively, an impact resistant material such as an elastomer may be used which has a damping effect for absorbing a drop impact.

The cap 40 is moved in a direction E in FIGS. 5 and 6 (toward the terminal portion 31 of the PC card 30) so as to cover the terminal portion 31 and the frame end portions 32 of the PC card. The cap 40 has a recess 40A which preferably has a size slightly smaller than the end portion of the PC card to be fitted in the cap 40 for preventing easy detachment of the cap 40 from the PC card 30 and permitting the PC card to be detached from the cap 40 by applying a moderate force. The cap 40 has thinner wall portions 41 provided at opposite ends of a front face thereof and each having a smaller thickness than the other portions thereof.

FIG. 6 is a perspective view of the PC card and the cap as viewed at an angle different from that in FIG. 5. As shown in FIG. 6, the cap 40 includes the recess 40A in which the terminal portion 31 and the frame end portions 32 of the PC card are fitted. The cap has grooves 43 and slats 44 provided widthwise thereof on upper and lower inner surfaces thereof in the recess 40A at positions not interfering with the dimples 36 on the ground-plate 33. The grooves 43 and the slats 44 are configured so that, when the cap 40 is attached to the PC card 30, the dimples 36 are received by the grooves 43, and the slats 44 are fitted on a flat portion of the ground plate 33 not formed with the dimples 36. Opposite edge portions of the recess 40A are configured so as to receive frame end portions 32 of various types of PC cards 30 each formed with a step 37 and a groove 38.

The slats 44 may be configured so as to be brought into press contact with the PC card when the PC card is press-fitted in the cap 40. With this arrangement, the cap 40 can be attached to all types of PC cards including the CardBus PC card, the 16-bit PC card and other PC cards having different voltage specifications. Further, the cap 40 can be attached to the PC card upside down irrespective of the vertical orientation of the cap 40. With the provision of the grooves 43, the CardBus PC card can be easily inserted into the cap 40, because the grooves 43 are guided by the dimples 36 when the cap 40 is attached to the PC card.

FIG. 7 is a perspective view illustrating the PC card 30 to which the cap 40 is attached. In this state, the terminal portion of the PC card is protected from dust, static electricity, moisture and shock during the carrying of the PC card. When the cap 40 is to be detached from the PC card 30, the cap 40 is moved in a direction F in FIG. 5 (away from the terminal portion 31 of the PC card 30). Where undulations or grooves are formed on upper and lower surfaces or side surfaces of the cap 40, the cap can be held by fingers without slippage. Thus, the cap is easier to handle.

In FIG. 3, the upper surfaces of the rails 13 and the support portions 14 are brought into contact with lower surfaces of the rail sliding portions 34 of the PC card 30. The PC card 30 is slidable on the rails 13 and the support portions 14 in a direction C (in which the PC card is withdrawn) and in a direction D (in which the PC card is inserted) in FIG. 1. The lower surfaces of the rail sliding portions 34 are highly slidable with a relatively small friction to ensure that the rail sliding portions 34 are slidably engaged with the rail grooves in the slot not shown.

The rail sliding portions 34 are slid with their lower surfaces in contact with the upper surfaces of the rails 13 and the support portions 14, whereby the PC card 30 can be stably moved in the directions C and D without sticking.

As described above, the cap 40 is engageable with the cap engagement portion 15 of the first cover 1. Stoppers 16 for restricting the movement of the cap 40 fitted in the cap engagement portion 15 in the direction C in FIG. 1 are provided on boundaries between the cap engagement portion 15 and the positioning projections 11. The surfaces of the stoppers 16 are opposed to the cap engagement portion 15.

The wall 9 has engagement projections 17 in association with the thin wall portions 41 provided in the front face of the cap. The engagement projections 17 are respectively fitted in the thin wall portions 41. The side wall portions 10B, 10B in the cap engagement portion 15 each have two sliding projections 18 provided on the interior surface thereof as extending widthwise thereof. The stoppers 16 and the projections 17, 18 restrict the movement of the cap 40 fitted in the cap engagement portion 15.

The second cover 2 includes a wall 20 provided upright on an outer edge of the rectangular top plate 2A thereof, and side wall portions 19, 19 provided upright on opposite side edges of the top plate 2A. The engagement member 7 is provided on a middle portion of the outer edge of the top plate 2A, and connected integrally to the top plate 2A via a thin hinge portion 7A pivotally about the hinge portion 7A. The engagement member 7 has the engagement hole 8 and, when the first cover 1 and the second cover 2 are pivoted about the hinge portions 4 and 5, respectively, to close the case, the engagement portion 6 of the first cover 1 is engaged with the engagement hole 8, thereby preventing the first and second covers 1, 2 from being opened. A middle portion of the wall 20 to be brought into contact with the engagement member 7 is indented inward as having dimensions corresponding to the thickness and width of the engagement member 7. When the engagement portion 6 of the first cover 1 is engaged with the engagement hole 8 as shown in FIG. 4, the engagement portion 7 is flush with opposite surface portions of the wall 20. The first cover 1 may include an engagement hole instead of the engagement portion 6, and the engagement member 7 may include an engagement portion instead of the engagement hole 8. In this case, the engagement portion is engaged with the engagement hole.

FIG. 4 is a perspective view of the case in a closed state. The top plates 1A, 2A of the first cover 1 and the second cover 2, the side wall portions 19, the wall 20 and the connection portion 3 define a box-shaped case, and the PC card is sealingly stored in the case. A reference numeral 25 denotes a pocket provided on an outer surface of the second cover 2, and an index label or the like can be inserted in the pocket.

As shown in FIG. 3, a pair of fixing portions 21 are provided on an inner edge portion of a back surface of the top plate 2A of the second cover 2. With the case being closed, the cap 40 engaged with the cap engagement portion 15 of the first cover 1 is fixed by the pair of fixing portions 21. Pressing portions 22 respectively provided on one-end portions of the fixing portions 21 are vertically opposed to the support portions 14 of the first cover 1 when the case is closed. Distal edges of the pressing portions 22 are located at substantially the same positions as the support portions 14 when being projected on a plane. After the PC card 30 is set in the first cover 1, the case is closed. With the engagement portion 6 of the cover 1 engaged with the engagement hole 8, the rail sliding portions 34 on the opposite sides of the PC card 30 are held between the support portions 14 and the pressing portions 22 from the upper and lower sides in the same positional relationship with substantially no gap.

A reference numeral 24 denotes stopper pieces provided at opposite ends of a corner defined by the top plate 2A and the wall 20. When the case is closed with the PC card set therein, the stopper pieces are brought into abutment against the rear face 35 of the PC card 30.

With the PC card 30 supported on the four support portions 14 of the first cover 1, the four positioning projections 11 respectively provided on the opposite side wall portions 10A, 10A, 10B, 10B restrict the widthwise position of the PC card 30. The cap 40 is fitted in the cap engagement portion 15 of the first cover 1, and the two thin wall portions 41 provided in the front face of the cap 40 lightly abut against the engagement projections 17 provided on the first cover 1. End faces 42 located at opposite sides of the recess 40A of the cap 40 respectively abut against the stoppers 16 of the side wall portions 10B, 10B. As a result, the cap 40 is held between the two projections 17 and the two stoppers 16 with no gap, and fixed so as to be prevented from being moved in the directions C and D. The sliding projections 18 are slightly spaced from the cap widthwise of the case so as to prevent the cap 40 from being significantly moved widthwise.

When a drop impact is applied to the case or the case is pressed from the outside, the resulting external force generally acts on the portions of the case which support the PC card. Hence, there is a possibility that a flexural stress, a shearing force or a torsional force would heavily act on the PC card. In general, a substrate and electrical components are mounted in the center portion of the PC card. If the center portion was supported, the external force would act on the center portion, thereby damaging the substrate and the electrical components in the PC card.

Figure 13:
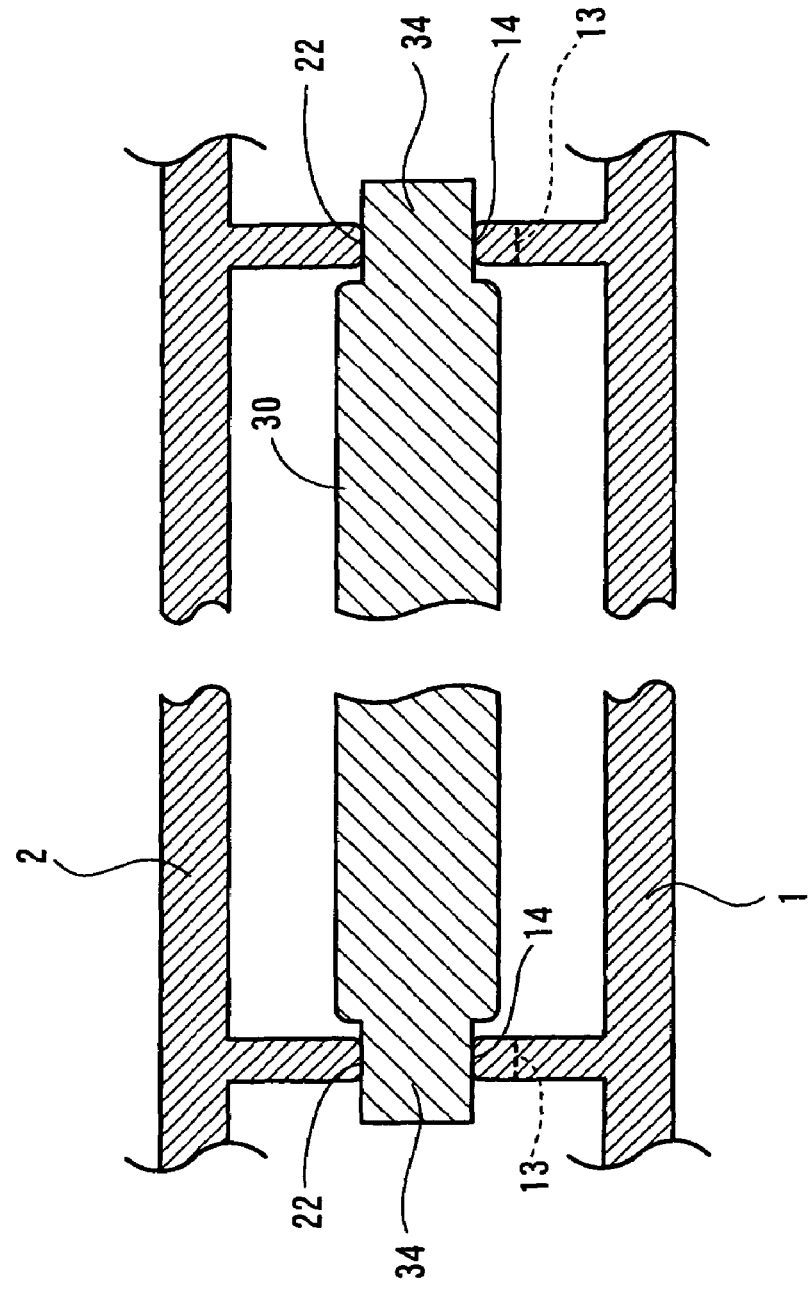
FIG. 13 is a sectional view of the case according to the first embodiment of the invention and the PC card.

FIG. 13 is a sectional view illustrating the support portions 14, the pressing portions 22 and the PC card 30 when the case is closed. In FIG. 13, the thicker center portion of the PC card having a thickness of 5 mm is spaced a sufficient distance from the first and second covers 1, 2. Even if the external force or the like acts on the case to deform the case, the case does not abut against the thicker portion of the PC card 30. Therefore, the external force does not act directly on the substrate and the electrical components in the PC card. The rail sliding portions 34 of the PC card 30 are typically defined by a frame composed of a metal, a resin or the like and, therefore, have a higher strength. The rail sliding portions 34 are respectively held between the support portions 14 and the pressing portions 22 from the upper and lower sides at the same level, whereby compressive forces act on the rail sliding portions 34 but no shearing force act on the rail sliding portions 34. Therefore, the PC card 30 is less liable to be broken. With this arrangement, the external force is less liable to act directly on the center portion of the PC card. As a result, the substrate and the electrical components in the PC card are less liable to be broken.

In FIGS. 1 to 3, a reference numeral 23 denotes the engagement pieces. The engagement pieces 23 and the wall portions 19 respectively formed with the engagement pieces 23 restrict the positional relation between the first cover 1 and the second cover 2 when the case is closed with the engagement pieces 23 in engagement with the grooves 12 formed in the side wall portions 10B of the first cover 1.

How to use the case with the cap having the aforesaid construction will hereinafter be described.

A first mode in which the PC card is taken out of the case with the cap attached thereto will be first described.

In the state shown in FIGS. 1 and 2, the PC card 30 is supported by the support portions 14 of the first cover 1. When the PC card 30 is moved in the direction A (away from the top plate 1A), the PC card 30 is detached from the first cover 1 in the direction A without interference. When the PC card 30 is moved in the direction A, the cap 40 is moved together with the PC card 30 in the direction A, because the cap 40 is not detached from the PC card 30 with the end portion of the PC card 30 press-fitted in the cap 40. As described above, the cap 40 is held by the engagement projections 17 and the stoppers 16 with no gap in the cap engagement portion 15 of the first cover 1. Further, the sliding projections 18 disposed in widthwise opposite relation prevent the cap 40 from being moved in directions other than the direction A. When the cap 40 is moved in the direction A, a frictional force acts on the cap 40 against the movement of the cap 40 because the cap 40 is held by the engagement projections 17 and the stoppers 16. However, the frictional force is not so great, so that the cap can be moved in the direction A by applying a force greater than the frictional force. As a result, the cap 40 can be taken out of the case with the PC card fitted therein. By properly adjusting the projecting amounts of the engagement projections 17, the frictional force is adjusted at a proper level which is greater than the weight of the PC card for preventing the PC card from dropping out of the case when the case is inverted.

Since the outer side wall portions 10A and the inner side wall portions 10B are not continuous, the rail sliding portions 34 of the PC card 30 can be easily held by fingers to lift the PC card 30 in the direction A.

Figure 8:
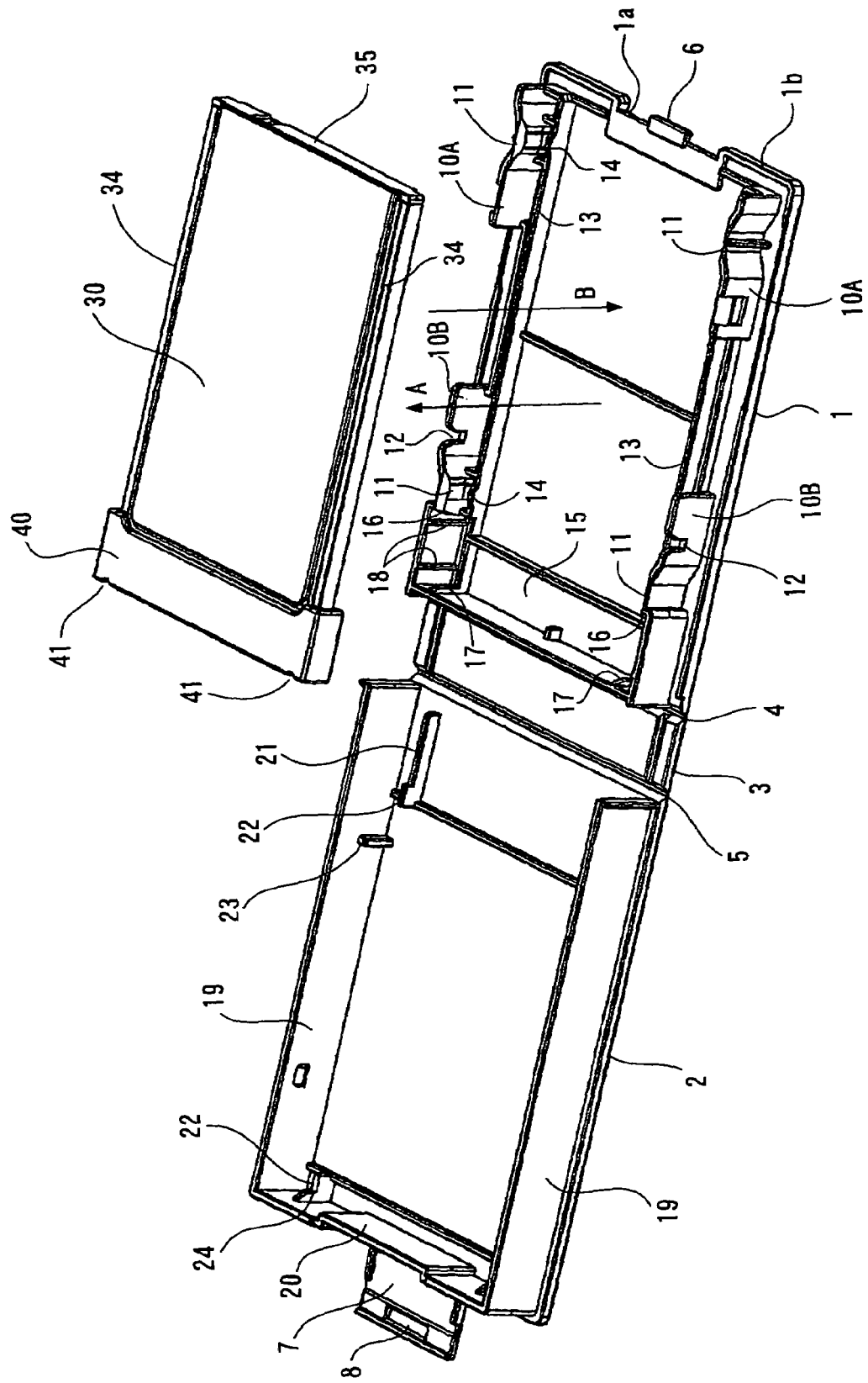
FIG. 8 is a perspective view illustrating a first mode according to the first embodiment of the invention.

FIG. 8 is a perspective view illustrating the PC card taken out with the cap attached thereto. When only the terminal portion 31 of the PC card 30 needs to be protected, it is convenient to carry or leave the card in this state, because the cap 40 is more compact than the case. When the PC card 30 is thereafter used, the cap 40 is manually detached from the PC card 30, and then the PC card 30 is inserted into the host side device not shown. The detached cap 40 may be left alone, but the cap is liable to be lost because of its small size. Therefore, the cap is engaged with the cap engagement portion 15 of the first cover 1 and stored in the case to prevent the loss of the cap 40.

When the PC card 30 is stored in the case with the cap attached thereto, the PC card 30 is moved in the direction B in FIG. 8 (toward the top plate 1A) with the case opened, and inserted in the first cover 1. The insertion of the PC card 30 and the cap 40 is facilitated by chamfering upper edges of the projections 11, 17, 18 and the stoppers 16. After the insertion, the PC card 30 is supported by the support portions 14 to be completely accommodated in the case. At this time, the cap 40 is held by the engagement projections 17 and the stoppers 16 to be fixed in the cap engagement portion 15 as described above. As a result, the PC card 30 is fixed to the first cover 1 via the cap 40.

When the engagement portion 6 of the first cover 1 is engaged with the engagement hole 8 of the second cover 2 with the case closed, the stopper pieces 24 of the second cover 2 substantially abut against the rear face 35 of the PC card 30, so that the PC card 30 is prevented from being detached from the cap 40 to be moved in a rearward direction (in the direction C). Thus, the PC card is completely accommodated in the case as shown in FIG. 4.

How to accommodate the PC card in the case with the cap 40 preliminarily set in the cap engagement portion 15 will be described later.

Next, a second mode in which the PC card is taken out of the case with the cap 40 fitted in the cap engagement portion 15 but not attached to the PC card will be explained.

The PC card 30 is lightly pressed against the support portions 14 by a finger in contact with a top plate of the PC card 30 in the state shown in FIGS. 1 and 2, and moved in the direction C in FIG. 1 in sliding contact with the support portions 14 and the rails 13. At this time, the engagement portion 6 is located at a position lower than the lower surface of the PC card 30, so that the outer edge of the first cover 1 is free from a high wall and a projection which may otherwise prevent the movement of the PC card. Therefore, the PC card 30 can be moved on the support portions 14 and the rails 13 in the direction C. On the other hand, the end portion of the PC card 30 is press-fitted in the cap 40, so that the cap 40 is likely to move together with the PC card 30 in the direction C.

Figure 9:
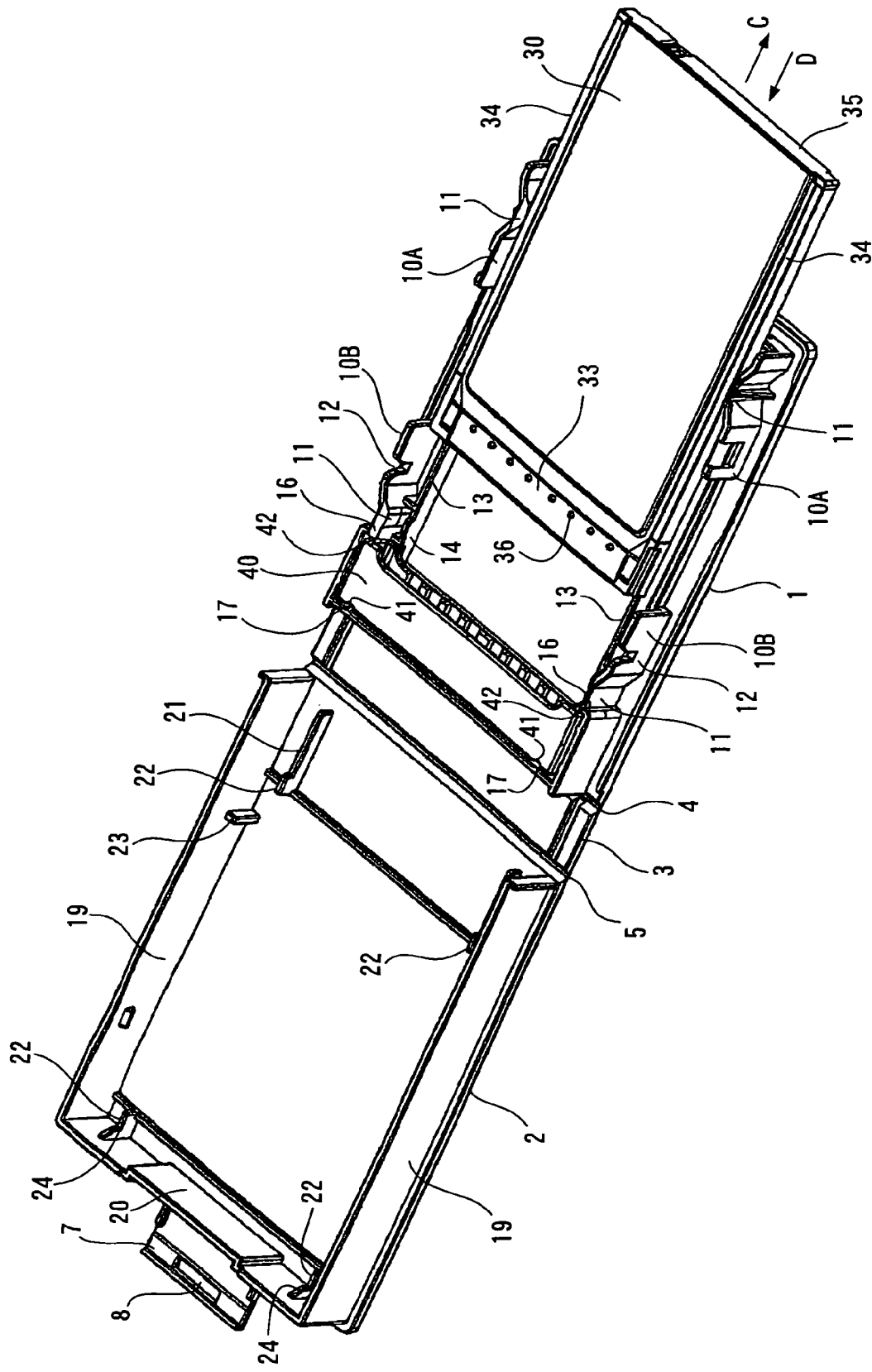
FIG. 9 is a perspective view illustrating a second mode according to the first embodiment of the invention.

However, the end faces 42 of the cap 40 abut against the stoppers 16 of the first cover 1, thereby preventing the movement of the cap 40. When the PC card 30 is moved in the direction C by applying a greater force, a force applied for pulling the PC card 30 becomes greater than the frictional force occurring between the ground plate 33 of the PC card 30 and the slats 44 of the cap 40, thereby disengaging the PC card 30 from the cap 40. As a result, the cap 40 is left in the cap engagement portion 15 of the first cover 1, whereby only the PC card 30 is taken out of the case. FIG. 9 is a perspective view illustrating a state in which the PC card is being taken out, and FIG. 10 is a perspective view illustrating a state in which the PC card has been taken out.

Figure 10:
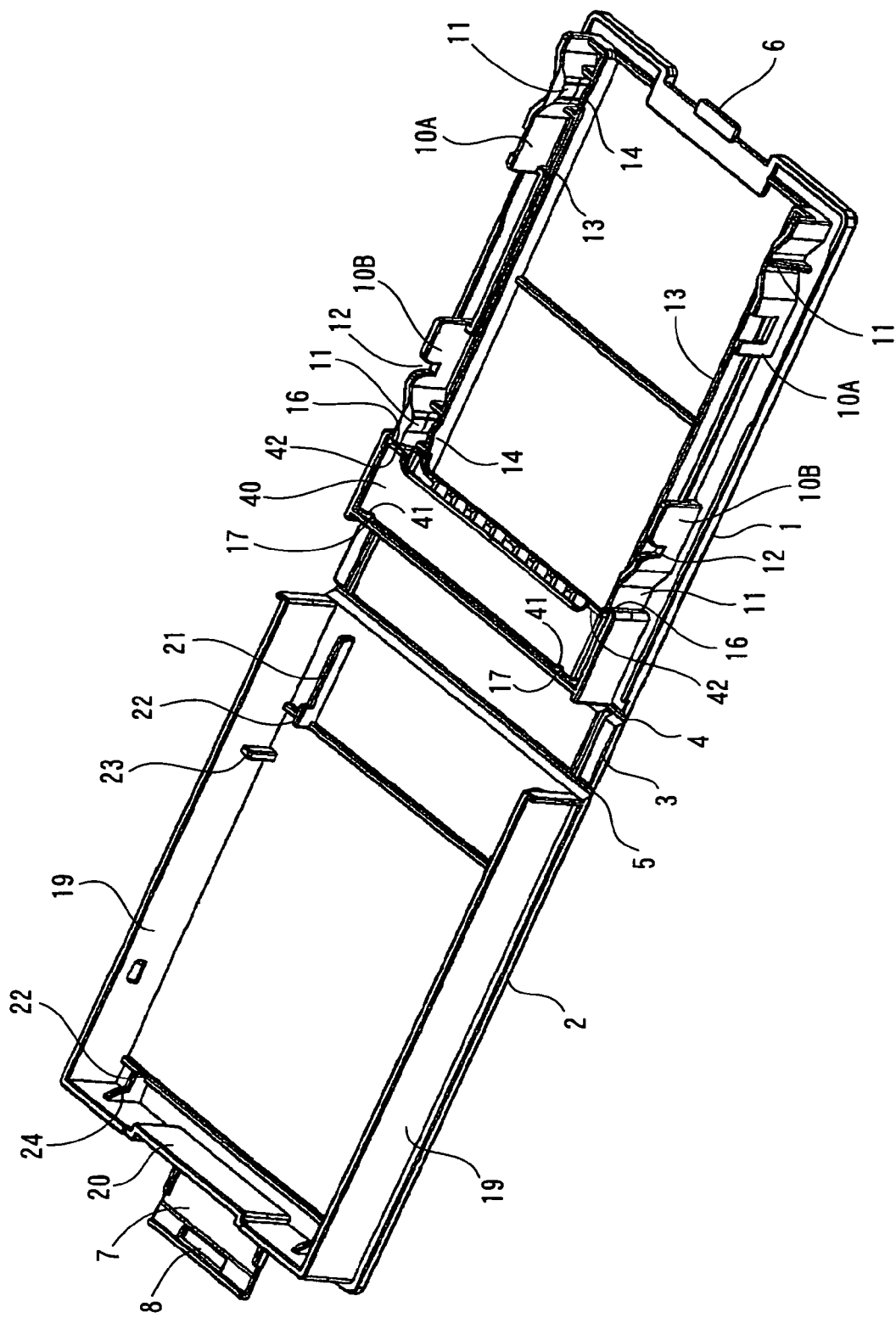
FIG. 10 is a perspective view illustrating the second mode according to the first embodiment of the invention.
Figure 11:
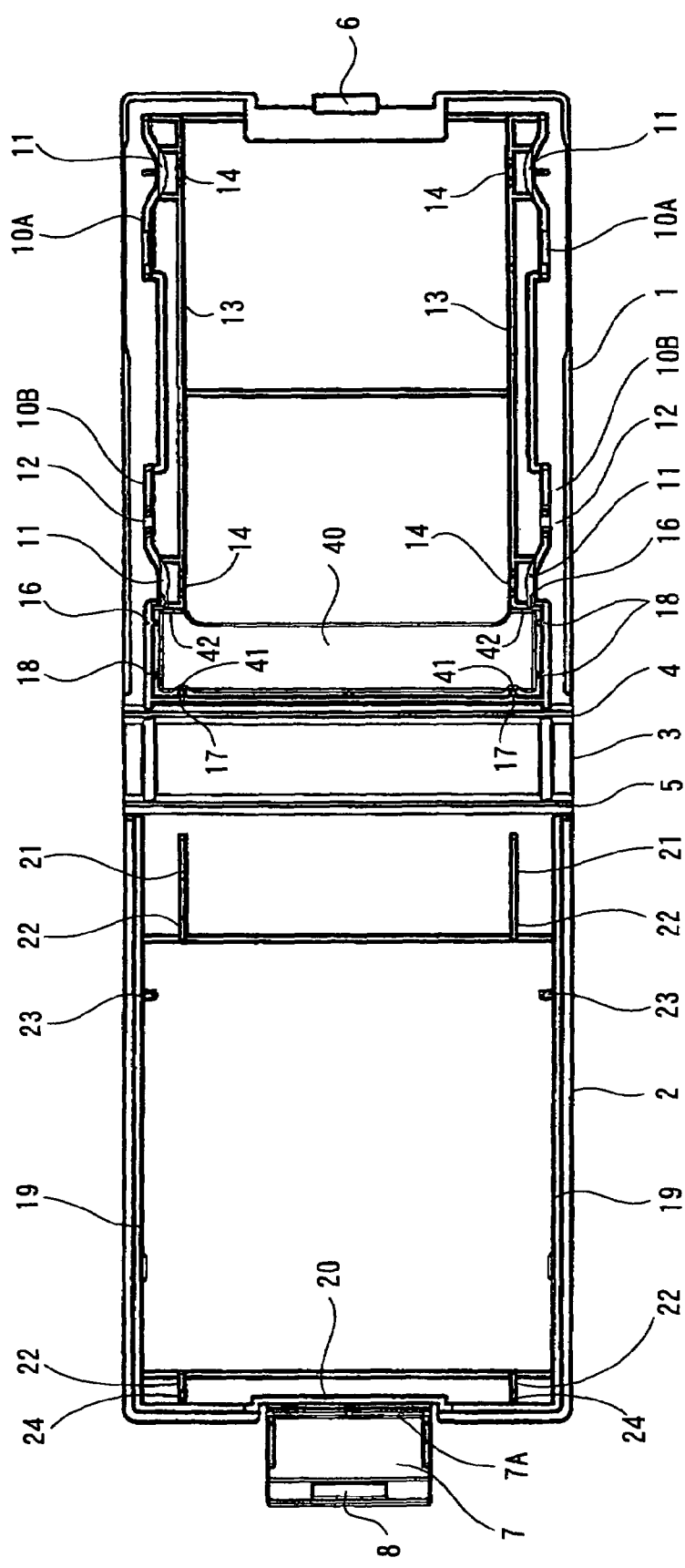
FIG. 11 is a plan view illustrating the second mode according to the first embodiment of the invention.

In FIG. 10, the cap 40 is fixed in the cap engagement portion 15 of the first cover 1. FIG. 11 is a plan view illustrating this state. When the case is closed in this state, the fixing portions 21 of the second cover 2 holds the cap 40 from the upper side. Therefore, even if a shock is applied to the case, the cap is prevented from being detached from the case.

As described above, the PC card can be taken out of the case with the cap 40 detached therefrom by moving the PC card in the direction C. This arrangement is convenient when the cap is not needed, e.g., when the PC card is to be immediately used. Since the cap 40 is fixed in the case, the cap 40 is not displaced in the case even if a shock is applied to the case. Therefore, when the PC card is to be stored in the case as will be described later, there is no need to reset the cap.

When the PC card is taken out of the case in the first mode and then the cap 40 is detached from the PC card, the cap 40 is manually set in the cap engagement portion 15 as shown in FIGS. 10 and 11.

When the PC card 30 is stored in the case, the case is opened as shown in FIG. 10, and the PC card is moved downward from the upper side to be brought into contact with the rails 13. At this time, the PC card is preferably brought into contact with the rails 13 or the support portions 14 at positions slightly apart in the direction C from a predetermined storage position as shown in FIG. 9. Thereafter, the PC card is moved in the direction D. The PC card 30 is movable on the rails 13 and the support portions 14 in the direction D. As previously described, the cap 40 is preliminarily fixed in the cap engagement portion 15. Therefore, the front edge of the PC card 30 is press-fitted into the recess 40A of the cap 40 to be completely engaged with the cap 40 by moving the PC card 30 in the direction D. At this time, the PC card 30 is slid on the rails 13 and the support portions 14. Since the rails 13 are smoothly continued to the respective support portions 14 with a little level difference, the PC card 30 is not significantly tilted nor stuck during the sliding thereof. Before the PC card 30 is inserted into the cap 40, the rail sliding portions 34 are supported on the four support portions 14 with the lower surfaces thereof in contact with the upper surfaces of the support portions 14. Therefore, the PC card 30 is positioned at a predetermined level, and inserted into the cap 40.

Figure 12:
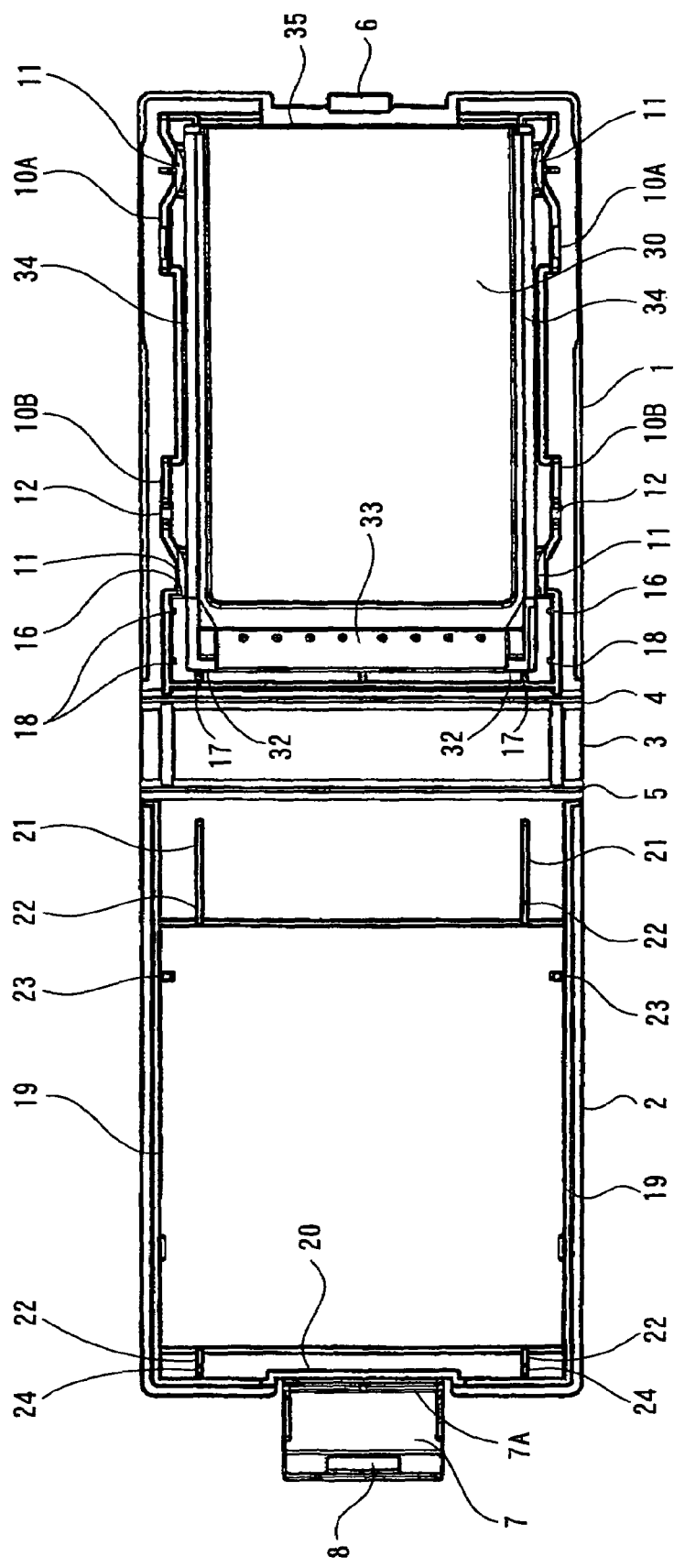
FIG. 12 is a plan view of the case according to the first embodiment of the invention in which the PC card is accommodated.

Upon completion of the insertion of the PC card 30, the cap 40 is fixed in the cap engagement portion 15 of the first cover 1, so that the PC card 30 is fixed to the first cover 1 via the cap 40. Then, the case is closed, and the engagement portion 6 of the first cover 1 is engaged with the engagement hole 8 of the second cover 2, whereby the stopper pieces 24 of the second cover 2 are substantially brought into abutment against the rear face 35 of the PC card 30. Therefore, the PC card is prevented from being detached from the cap 40 to be displaced toward the rear side (in the direction C). Thus, the PC card is completely accommodated in the case as shown in FIG. 4.

Where the cap 40 becomes missing, the PC card is stored in the case without the cap 40 until an alternative cap is prepared. FIG. 12 is a plan view of the inventive case in which the PC card is accommodated without the cap. The thin wall portions 41 are provided at the opposite ends of the front face of the cap 40, and brought into abutment against the engagement projections 17 of the first cover 1 of the inventive case. The thin wall portions 41 have the smallest possible thickness and, when the PC card is accommodated in the case without the cap, a gap equivalent to the thickness of the thin wall portions is present between the PC card and the engagement projections 17. A gap defined between the wall 9 and the front edge of the PC card 30 fitted with the cap 40 differs from a gap defined between the wall 9 and the front edge of the PC card 30 not fitted with the cap 40, and the difference in the gap is reduced as compare with an arrangement in which the engagement projections 17 are not provided on the wall 9 and the cap 40 does not have the thin wall portions 41. If the cap entirely has a thickness equivalent to the thickness of the thin wall portions, the cap 40 has a reduced strength. By providing the thin wall portions 41 in parts of the cap 40 as in this embodiment, the difference in the gap depending on the presence or absence of the cap can be minimized without sacrificing the strength of the entire cap. The portions of the cap formed with the thin wall portions preferably each have a minimum area. The thin wall portions 41 may be provided at any positions of the front edge of the cap, but are desirably provided at positions adjacent to the opposite ends of the cap for higher positioning accuracy.

Holes may be provided instead of the groove-like thin wall portions 41 as extending through the front face of the cap. In this case, spike-like projections provided on the inner surface of the wall 9 are inserted through the holes to be brought into abutment against the frame end portions 32 of the PC card, whereby the gap between the PC card and the case can be kept constant irrespective of the presence and absence of the cap. Where the holes are provided at positions abutting against the terminal portion 31, dust, moisture and the like may intrude into the terminal portion 31 through the holes to lessen the effects of the cap. Therefore, the holes are preferably provided in association with the frame end portions 32 on the opposite sides of the terminal portion. Thus, the terminal portion 31 is covered with the cap 40 even if the cap 40 is formed with the holes. Therefore, the intrusion of the dust and the moisture into the terminal portion 31 can be prevented.

In this embodiment, the cap engagement portion 15 is provided adjacent the connection portion 3, but may be provided on an outer edge portion opposite from the connection portion 3. In this case, the PC card 30 is inserted from a side opposite from that in this embodiment. With the arrangement according to this embodiment, however, the PC card 30 is less likely to abut against the connection portion 3 and the second cover 2 when the PC card is inserted parallel to the top plate 1A of the first cover. Therefore, the attachment and detachment of the PC card 30 are facilitated.

In general, the engagement member 7 is manually pivoted upward to open the case. In most cases, the first cover 1 is located on the lower side, and the second cover 2 is located on the upper side. The PC card 30 is set in the first cover 1 located on the lower side, whereby the PC card 30 is prevented from dropping out of the case when the case is opened.

As described above, the PC card 30 can be inserted into the cap 40 irrespective of the vertical directional orientation thereof. Further, the cap 40 can be inserted and fixed in the cap engagement portion 15 irrespective of the vertical directional orientation thereof. The PC card 30 except the dimples and the front edge thereof is symmetric irrespective of the vertical directional orientation, so that the cap 40 can be attached to or detached from the PC card 30 irrespective of the vertical directional orientation when the cap 40 and the PC card 30 are engaged with the first cover 1.

In this embodiment, the projections 11, 17, 18, the pressing portions 22, the stopper pieces 24 and the support portions 14 are formed integrally with the cover, but may each be formed of an elastic material such as a rubber and bonded to the cover by bonding means. With this arrangement, an impact force is absorbed by the elastic material and is less liable to be conducted to the PC card. Therefore, the case is more resistant to a drop impact and the like. Although the projections 17 are adapted to be brought into abutment against the thin wall portions 41 or the end portions 32 of the PC card and the stopper pieces 24 are adapted to be brought into abutment against the rear face 35 of the PC card, small gaps may be provided between the projections 17 and the thin wall portions 41 or the end portions 32 and between the stopper pieces 24 and the rear face 35 in consideration of dimensional variations of the components.

In this embodiment, the connection member 3 is provided between minor edges of the first and second covers 1 and 2, but may be provided between major edges of the first and second covers 1 and 2.

Second Embodiment

Figure 14:
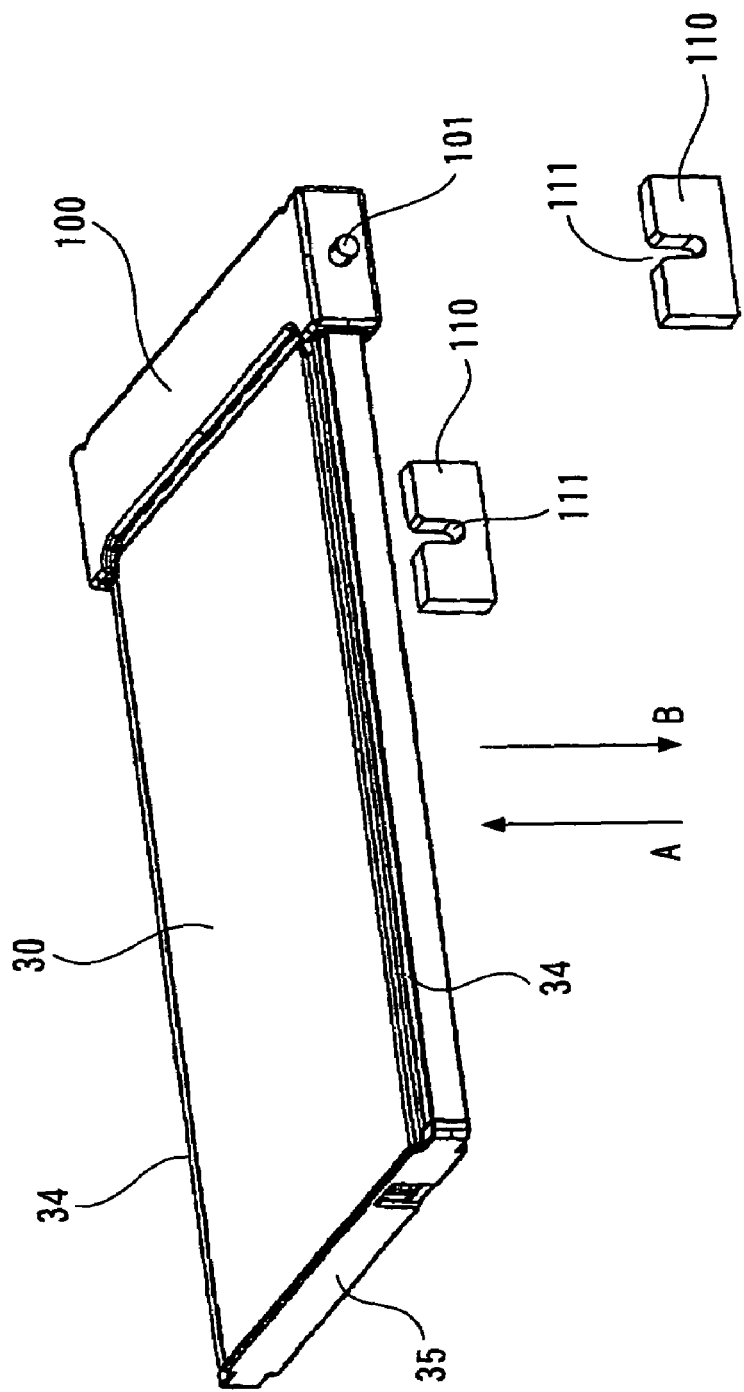
FIG. 14 is a perspective view illustrating a cap and a case according to a second embodiment of the invention.
Figure 15:
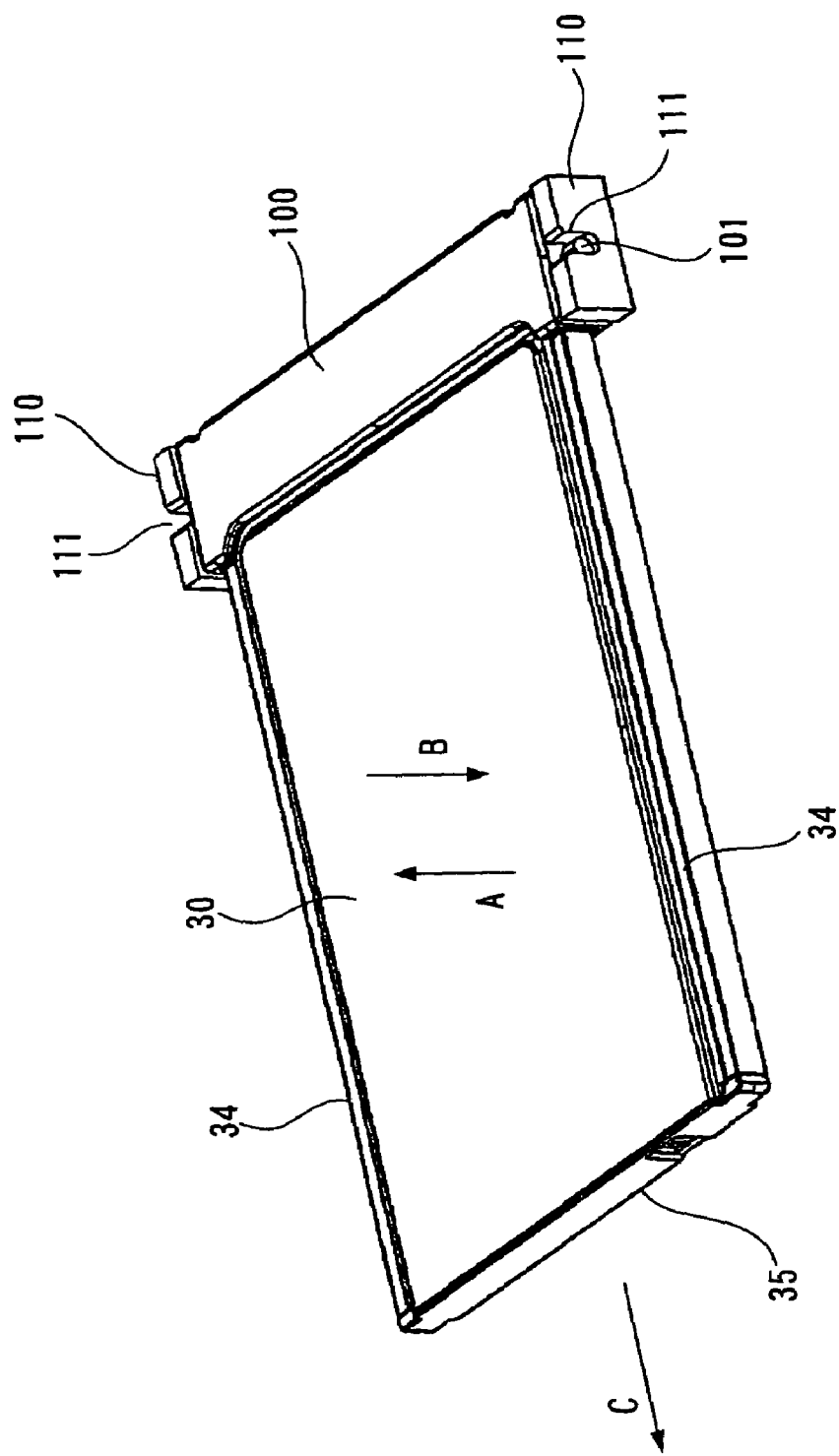
FIG. 15 is a perspective view illustrating the cap and the case according to the second embodiment of the invention.
Figure 16:
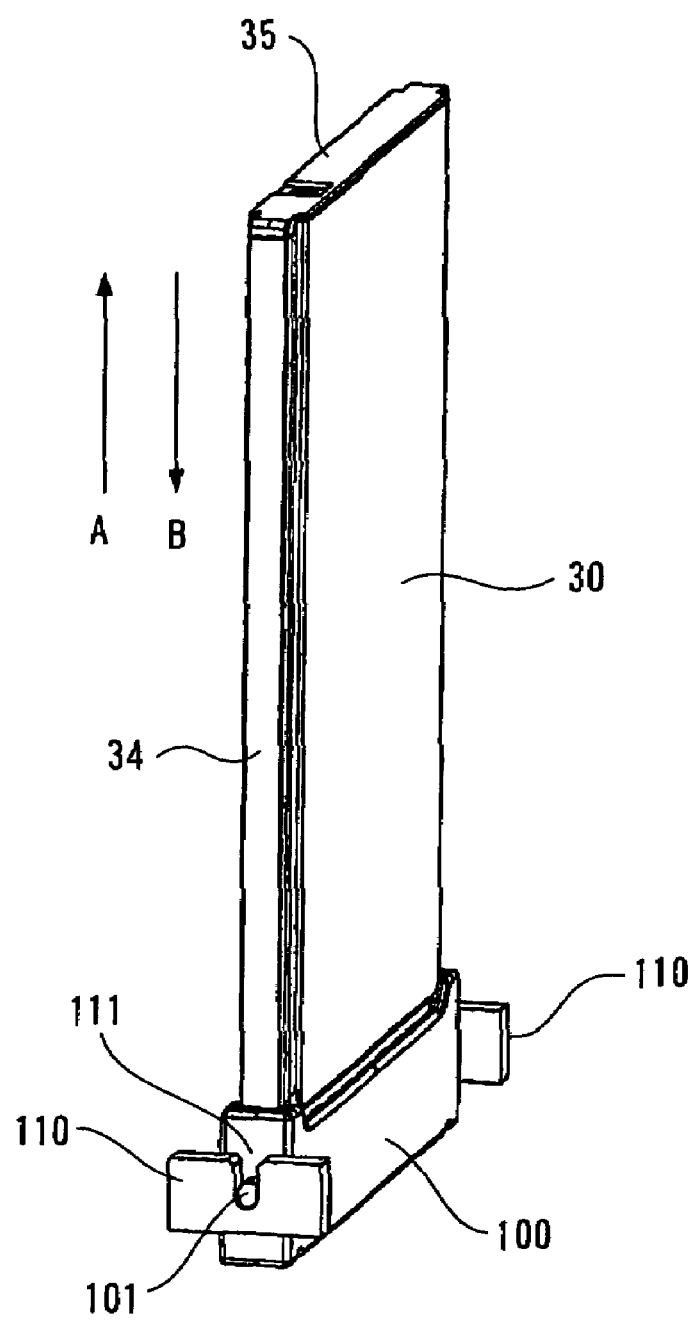
FIG. 16 is a perspective view illustrating the cap and the case according to the second embodiment of the invention.

FIGS. 14 to 16 illustrate a second embodiment of the present invention. FIGS. 14 to 16 are perspective views illustrating a cap according to the second embodiment of the present invention and the PC card 30. In FIGS. 14 to 16, a reference numeral 100 denotes the cap, which is different from the cap of the first embodiment in that shafts 101 are provided on opposite sides of the cap integrally with the cap. A reference numeral 110 denotes shaft receiving portions which partly define the cap engagement portion of the first cover 1. The shaft receiving portions 110 respectively have slits 111 which open in a direction A and are engageable with the shafts 101. With this arrangement, when the PC card is moved in a direction B, the shafts 101 are brought into engagement with the slits 111, whereby the PC card 30 is set in the first cover 1 as shown in FIG. 15. When the PC card 30 is moved in the direction A in this state, the PC card 30 can be taken out of the case with the cap attached thereto. When the PC card is moved in a direction C, the movement of the PC card per se is permitted, but the cap 100 is prevented from being moved in the direction C with the shafts 101 being engaged with the slits 111. As a result, only the PC card 30 is moved in the direction C, and the cap 100 is engaged with the slits 111 to be left in the first cover 1. Where the PC card is pivoted about the shafts to be positioned vertically as shown in FIG. 16 and then moved in the direction A when the PC card is taken out, the slits 110 do not prevent the movement of the shafts 101 of the cap 100. Thus, the PC card can be taken out with the cap 100 attached thereto. The shaft receiving portions 110 are spaced upward from the top plate 1A in the cap engagement portion 15, whereby the cap 100 can be pivoted to be positioned vertically without interference with the top plate 1A.

Third Embodiment

Figure 17:
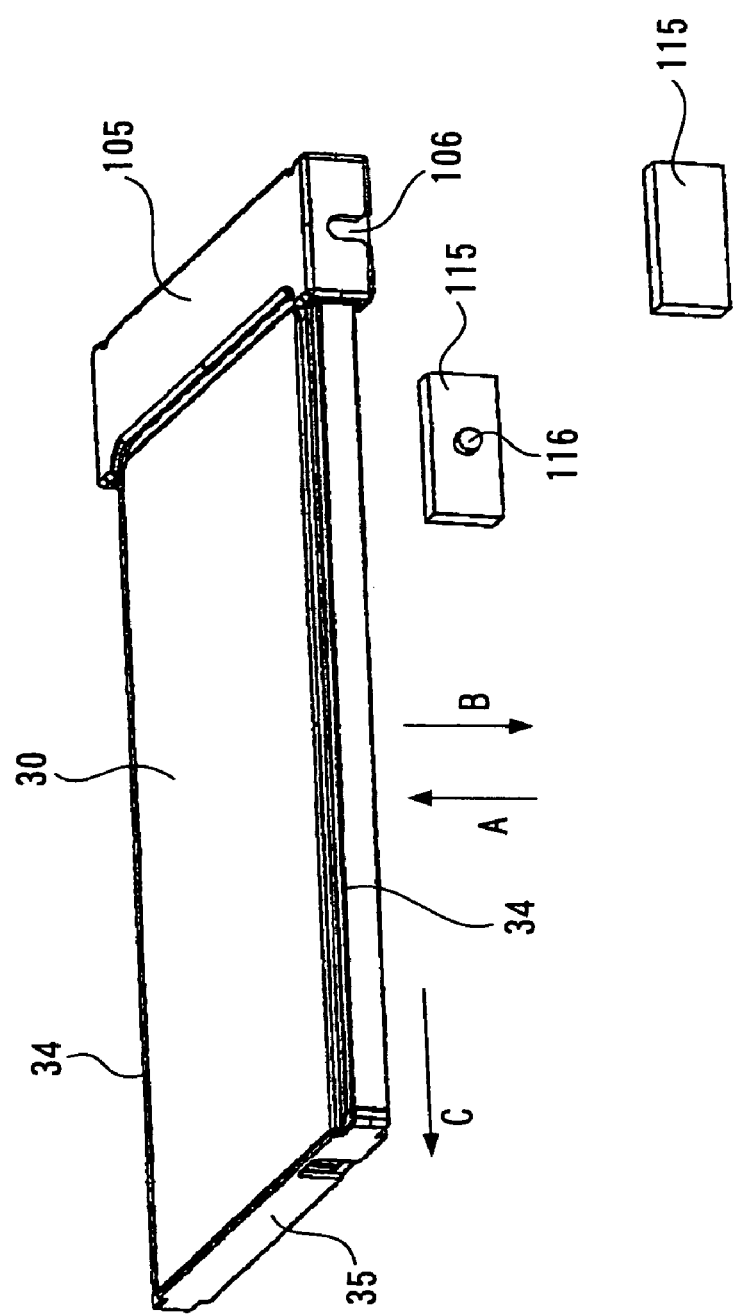
FIG. 17 is a perspective view illustrating a cap and a case according to a third embodiment of the invention.

A third embodiment of the present invention is illustrated in FIG. 17. FIG. 17 is a perspective view illustrating a cap according to the third embodiment of the invention and the PC card 30. The third embodiment differs from the second embodiment in that the cap 105 has grooves 106 which each open in a direction B and shaft receiving portions 115 partly defining the cap engagement portion of the first cover 1 respectively have shafts 116. With this arrangement, the PC card 30 is moved in the direction B with the cap attached thereto, whereby the PC card 30 is accommodated in the case with the shafts 116 engaged with the grooves 106. By moving the PC card in a direction A, the PC card is taken out of the case with the cap attached thereto. By moving the PC card in a direction C, the shafts 116 prevent the movement of the cap in engagement with the grooves 106, whereby only the PC card 30 can be taken out.

INDUSTRIAL APPLICABILITY

The inventive case with the cap for the card-type portable information processing device permits a user to take out the PC card from the case with or without the cap attached to the PC card. Thus, the cap and the case are convenient to use, and resistant to dust, moisture, static electricity, impact and the like. Therefore, the case is useful for storing a PC card or a like card-type portable information processing device to be used in open air and in various environments.

The invention claimed is:

1. A storage case for an information processing card, such information processing card having a terminal end for connecting to electrical devices, said storage case further for storing a corresponding cap for covering the terminal end of such information processing card, the storage case comprising:
   a first cover,
   a second cover for connecting to the first cover in a closed position to form an enclosed storage space for an information processing card and a corresponding cap, and
   a cap engagement portion on at least one of the first and second covers for engaging a cap covering a terminal portion of an information processing card, wherein
   when the case is open, the cap engagement portion permits removal in a first direction of a data processing card from the at least one cover having the cap engagement portion thereby disengaging such data processing card from a cap stored in the storage case, and permits removed in a second direction of a data processing card from the at least one cover having the cap engagement portion, without disengaging such data processing card from such cap.

2. The storage case for an information processing card according to claim 1, further comprising means for permitting an information processing card to move on at least one of the first and second covers in a direction substantially parallel to the at least one cover having the cap engagement portion,
   wherein the cap engagement portion limits the movement direction of a cap to a vertical direction relative to a horizontal surface of the at least one cover having the cap engagement portion, and
   when an information processing card is moved parallel to the at least one cover having the cap engagement portion away from the cap such information processing card disengages from the cap, and when an information processing card is moved parallel to the at least one cover having the cap engagement portion toward the cap such information processing card engages with the cap.

3. The storage case for an information processing card according to claim 2, wherein a support portion is located on the at least one cover having the cap engagement portion, and when an information processing card is moved parallel to the at least one cover having the cap engagement portion, a lower surface thereof is in sliding contact with the support portion.

4. A storage system comprising the storage case for an information processing card according to claim 3, further comprising an information processing card, wherein
the information processing card is a PC card having rail sliding portions located on opposite sides of the PC card, and
the support portion provided on the at least one cover having the cap engagement portion for supporting the PC card is brought into contact with the rail sliding portions of the PC card.

5. The storage system according to claim 4, wherein
the first cover comprises the support portion for supporting the PC card, and the second cover has a pressing portion for pressing the PC card, and
the support portion and the pressing portion are vertically opposed to each other and are for being substantially brought into contact with the rail sliding portions provided on the opposite sides of the PC card when the case is closed.

6. A storage system comprising the storage case for an information processing card according to claim 2, further comprising a cap, wherein the cap has a thin wall portion located on a front edge thereof, and the at least one cover having the cap engagement portion has an engagement projection for abutting against the thin wall portion of the cap.

7. A storage system comprising the storage case for an information processing card according to claim 2, further comprising a cap,
wherein the cap has a hole located in a front face thereof, such that when an information processing card is inserted into the cap, the hole is not opposite the terminal portion of such information processing card,
and wherein the at least one cover having the cap engagement portion has an engagement projection having a distal end for being inserted through the hole to abut a front edge of such information processing card.

8. The storage case for an information processing card according to claim 1, wherein the first cover and the second cover are connected to each other via a connection portion, and the cap engagement portion located adjacent the connection portion.

9. The storage case for an information processing card according to claim 8, wherein
engagement means are provided at edges of the first and second covers, and
the engagement means include an engagement portion located on one of the first and second covers and an engagement member located on the other cover to be engaged with the engagement portion.

10. A storage system comprising the storage case for an information processing card according to claim 1, further comprising a cap and an information processing card,
wherein the information processing card is a CardBus PC card comprising a ground plate, the ground plate comprising dimples, and
wherein the cap is engageable with an end portion of the CardBus PC card, and has grooves provided in upper and lower inner faces of a recess thereof to be engaged with said dimples on the ground plate of the CardBus PC card.

11. A storage system comprising the storage case for an information processing card according to claim 1, further comprising a cap,
wherein the cap comprises one of a shaft and a shaft receiving portion, and the at least one cover having the cap engagement portion comprises the other of the shaft and the shaft receiving portion.

12. A case for storing an information storage device, such information storage device having a terminal end and a cap for covering such terminal end, comprising:
a case comprising a first cover and a second cover, the case having a closed position in which the two covers are connected, and an open position in which at least one end of each of the two covers is disconnected from the other, and
a cap engagement portion on at least one of the two covers comprising at least one projection,
wherein when the case is in the open position, the cap engagement portion permits removal of such information storage device in one direction for disengaging such information storage device from such cap,
and the cap engagement portion permits removal of such information storage device in a second direction without disengaging such information storage device from such cap.

* * * * *